No. 838,311. PATENTED DEC. 11, 1906.
C. C. FARMER.
TESTING DEVICE FOR TRIPLE VALVES.
APPLICATION FILED FEB. 17, 1904.

No. 838,311. PATENTED DEC. 11, 1906.
C. C. FARMER.
TESTING DEVICE FOR TRIPLE VALVES.
APPLICATION FILED FEB. 17, 1904.

WITNESSES:

INVENTOR:
Clyde C. Farmer
by Paul Synnestvedt
ATTORNEY.

UNITED STATES PATENT OFFICE.

CLYDE C. FARMER, OF CHICAGO, ILLINOIS, ASSIGNOR TO WESTINGHOUSE AIR BRAKE COMPANY, OF WILMERDING, PENNSYLVANIA, A CORPORATION OF PENNSYLVANIA.

TESTING DEVICE FOR TRIPLE VALVES.

No. 838,311.  Specification of Letters Patent.  Patented Dec. 11, 1906.

Application filed February 17, 1904. Serial No. 194,110.

*To all whom it may concern:*

Be it known that I, CLYDE C. FARMER, a citizen of the United States, residing at Chicago, in the State of Illinois, have invented certain new and useful Improvements in Testing Devices for Triple Valves, of which the following is a specification.

This invention has reference to an improved form of testing device for use in testing the flow of fluid and for making such test in either of two directions, that is for reversing the direction of the operation of the device, and the particular use to which the invention is put is the testing of the fit and friction to movement of triple valve packing rings and attached parts, so as to determine the condition thereof both in application and in release position of the triple valve piston.

While the special use to which I put the device is as above stated, it is obvious that it is applicable to other places and other uses, and I have therefore not shown any other portions of the testing mechanism particularly employed in conjunction with the triple valve test referred to, having confined the illustration accompanying this specification to views showing the testing device itself, the same being shown in preferred form in the accompanying drawing, in which—

Figure 1:
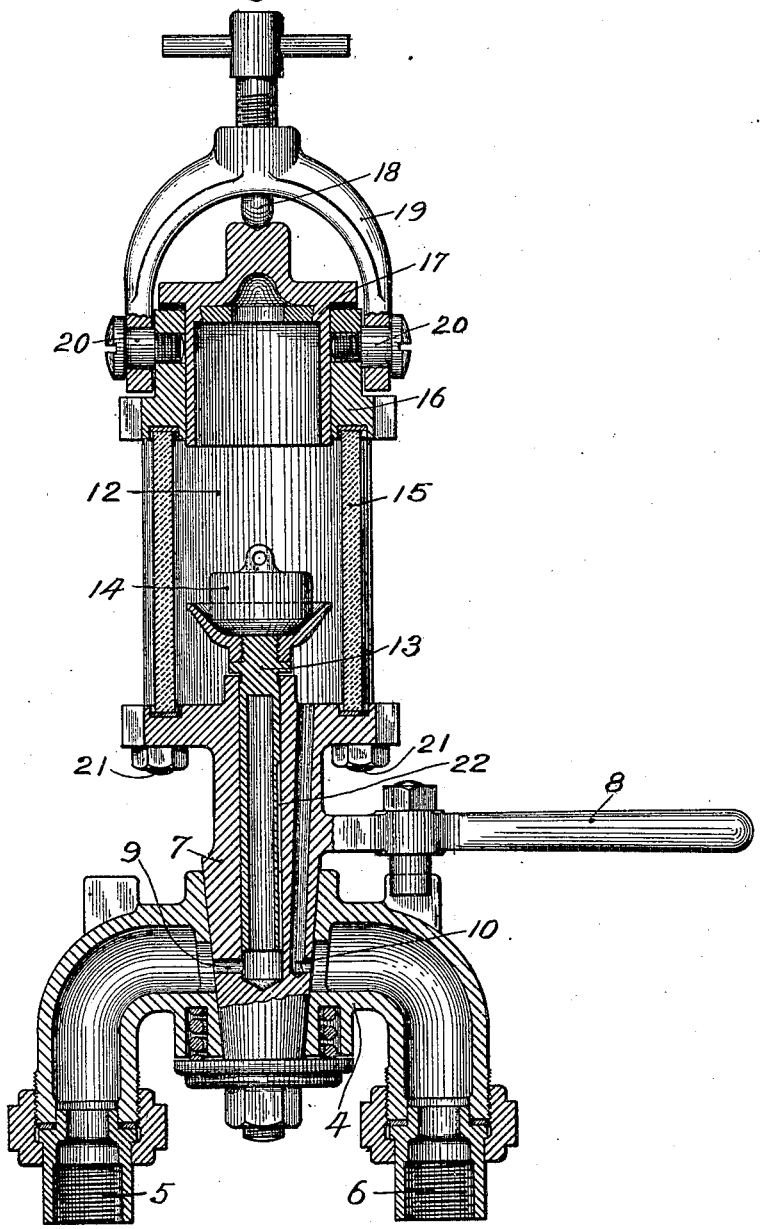
Figure 1 is a section view of the apparatus taken on a vertical plane.
Figure 2:
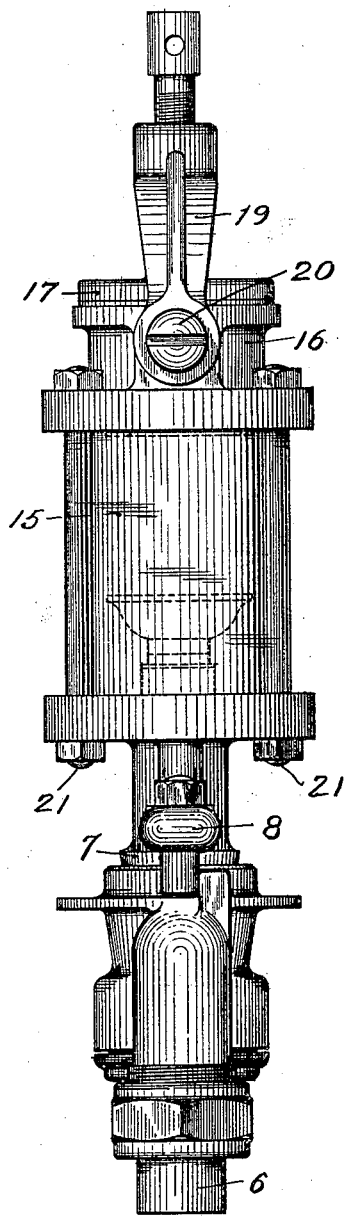
Figure 2 is a side elevation thereof.
Figure 3:
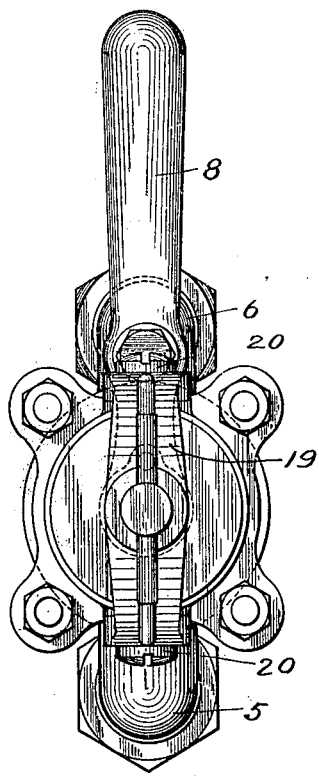
Figure 3 is a plan view.

Referring more particularly to Figure 1, it will be seen that in carrying out my invention I provide a valve body or casing 4 having two fluid pressure connections 5 and 6 thereto, and a movable valve 7 with a handle 8 for operating the same, and fluid pressure passages 9 and 10 in said valve, both of which lead into a chamber 12 that contains the upper end of a plunger 13. The vertical portion of the passage 9 is adapted to form a socket for the reception of the plunger 13, which controls the passage 9 but not the passage 10, the chamber 12 being of sufficient capacity to permit the rising and falling movement of the plunger, which occurs by action of the fluid pressure underneath the same in opposition to a weight 14 with which the plunger is provided, the size whereof, obviously, can be altered at will.

The plunger controlled passage 9 is the inlet passage and the open passage 10 is the outlet passage from the chamber 12, and it will be obvious that by moving the handle 8 around 180 degrees the positions of the openings 9 and 10 will be reversed, so that whereas in the position shown 5 is the inlet and 6 the outlet from the device; if the handle be reversed in position that is moved around 180 degrees 6 will become the inlet and 5 the outlet and a reversal of the action of the device will be obtained.

In order to render the movement of the plunger 13 visible the chamber is formed with transparent side walls 15, and in order to render the weight and also the plunger readily accessible so that the plunger may be cleaned, which is frequently required in a device of this character, and the weight readily changed when tests are to be made with different weights, the chamber is provided with a cover 16 which has in turn a removable portion or cap 17 held down by means of the screw bolt 18 passing through a yoke 19 secured on opposite sides by the pivotal supports 20, so that when the screw bolt 18 is loosened a little, the yoke can be swung out of the way and the cap 17 readily removed. The cover part 16 and the transparent tube 15 are held in place by the bolts 21. The operation of the device is as follows:

Assuming the parts to be in the position shown in Figure 1, air will be entering through the inlet 5 and the passage 9 and will tend to press on the plunger 13 until it has raised it sufficiently far to open the passage 22 when the air will escape through the passage 22 and pass down through the passage 10 and the outlet 6, the amount of pressure required to raise the plunger being determined of course by the weight placed thereon at 14. By proper regulation of the weight placed upon the plunger any amount of pressure required to accomplish any desired test being thus dependent on the weight on the plunger. As in testing a triple valve it may thus be determined to what point the pressure has to rise to secure proper movement of the triple valve piston. That is to say if the resistance exceeds that of the plunger it will rise and if not the triple valve piston will move the plunger remaining still. Thus in any case in which the pressure required to move the parts should not exceed a certain limit, the device can be tested by this apparatus in the manner described. If it now be desired to make a test in the reverse direction, as for example, to determine that the reverse movement of the triple valve piston does not require more than a predetermined pressure (where the device is used for testing triple valves) then the handle 8 is moved 180 degrees, reversing the position of the openings 9 and 10, so that the inlet is from 6 and the outlet at 5, when as will be observed the action of the device will be just the reverse of what has just been described.

Having thus described my invention and illustrated its use, what I claim as new, and desire to secure by Letters Patent, is the following:

1. A pressure indicator comprising in combination, a valve casing having two fluid pressure connections, a reversible valve in said casing, a plunger chamber mounted upon the valve, said valve having a pair of ports or passages connecting the plunger chamber and fluid pressure connections, one of said passages being adapted to form a socket for the reception of a plunger together with a plunger fitted to slide in said socket and adapted to be acted upon by pressure from either connection.

2. A pressure indicator comprising in combination, a valve casing having two fluid pressure connections, a reversible valve in said casing, a plunger chamber mounted upon the valve, said valve having a pair of ports or passages connecting the plunger chamber and fluid pressure connections, one of said passages being adapted to form a socket for the reception of a plunger together with a weighted plunger fitted to slide in said socket and adapted to be acted upon by pressure from either connection.

3. A pressure indicator comprising in combination, a valve casing having two fluid pressure connections, a reversible valve in said casing, a plunger chamber mounted upon the valve, said valve having a pair of ports or passages connecting the plunger chamber and fluid pressure connections, one of said passages being adapted to form a socket for the reception of a plunger together with a plunger fitted to slide in said socket and provided with a passage for a portion of its length, whereby the stroke of the plunger within the socket will be regulated, substantially as described.

4. A pressure indicator comprising in combination, a valve casing having two fluid pressure connections, a reversible valve in said casing, a plunger chamber having a transparent wall mounted upon the valve, said valve having a pair of ports or passages, connecting the plunger chamber and fluid pressure connections, one of said passages being adapted to form a socket for the reception of a plunger, together with a grooved plunger fitted to slide in said socket, substantially as described.

5. A pressure indicator comprising in combination, a valve casing having two fluid pressure connections, a reversible valve in said casing, a plunger chamber having a removable lid, and being mounted upon the valve, said valve having a pair of ports or passages, connecting the plunger chamber and fluid pressure connections, one of said passages being adapted to form a socket for the reception of a plunger, together with a grooved plunger fitted to slide in said socket, substantially as described.

6. A pressure indicator comprising in combination, a valve casing having two fluid pressure connections, a reversible valve in said casing, a plunger chamber having a removable lid and a yoke and screw bolt for holding said lid in place, and being mounted upon the valve, said valve having a pair of ports or passages, connecting the plunger chamber and fluid pressure connections, one of said passages being adapted to form a socket for the reception of a plunger, together with a grooved plunger fitted to slide in said socket, substantially as described.

In testimony whereof I have hereunder signed my name in the presence of the two subscribed witnesses.

CLYDE C. FARMER.

Witnesses:
    PAUL SYNNESTVEDT,
    PAUL CARPENTER.